US010830406B2

United States Patent
Kurosu et al.

(10) Patent No.: US 10,830,406 B2
(45) Date of Patent: Nov. 10, 2020

(54) PROJECTOR TYPE HEADLAMP

(71) Applicants: STANLEY ELECTRIC CO., LTD., Tokyo (JP); NALUX CO., LTD., Osaka (JP)

(72) Inventors: Hiroaki Kurosu, Tokyo (JP); Kayuri Kinoshita, Tokyo (JP); Kouei Hatade, Osaka (JP); Norihisa Sakagami, Osaka (JP)

(73) Assignees: Stanley Electric Co., Ltd., Tokyo (JP); Nalux Co., Ltd., Osaka (JP)

( * ) Notice: Subject to any disclaimer, the term of this patent is extended or adjusted under 35 U.S.C. 154(b) by 181 days.

(21) Appl. No.: 16/191,777

(22) Filed: Nov. 15, 2018

(65) Prior Publication Data

US 2019/0086052 A1 Mar. 21, 2019

Related U.S. Application Data

(63) Continuation of application No. PCT/JP2017/017848, filed on May 11, 2017.

(Continued)

(51) Int. Cl.
*F21V 21/00* (2006.01)
*F21S 41/255* (2018.01)
(Continued)

(52) U.S. Cl.
CPC ............ *F21S 41/255* (2018.01); *F21S 41/00* (2018.01); *F21S 41/275* (2018.01); *F21S 41/40* (2018.01);
(Continued)

(58) Field of Classification Search
CPC ........ F21S 41/255; F21S 41/275; F21S 41/00; F21S 41/40; F21V 5/04; G02B 5/1814; G02B 13/00; G02B 27/0037
(Continued)

(56) References Cited

U.S. PATENT DOCUMENTS 3,708,221 A 1/1973 Schaefer
3,743,385 A 7/1973 Schaefer
(Continued)

FOREIGN PATENT DOCUMENTS

EP 2 690 348 A2 1/2014
JP 2009-199938 A 9/2009
(Continued)

OTHER PUBLICATIONS

International Search Report and Written Opinion dated Aug. 1, 2017 corresponding to International Patent Application No. PCT/JP2017/017848, and partial English translation thereof.

(Continued)

*Primary Examiner* — Laura K Tso
(74) *Attorney, Agent, or Firm* — Squire Patton Boggs (US) LLP

(57) ABSTRACT

The projector-type headlamp comprises a projection lens unit and a light source unit. A diffraction grating designed to eliminate chromatic aberrations is provided on at least part of a lens surface of the lens unit. When an x axis in the horizontal direction and a y axis in the vertical direction are defined on a plane perpendicular to the optical axis, R1 is the maximum y coordinate on the lens surface, and $0 \leq A < 1$, an area of the lens surface in which $y < A \cdot R1$ comprises a curved surface or a flat surface, at least partially provided with the diffraction grating, and an area of the lens surface in which $y \geq A \cdot R1$ comprises a separate curved surface that has a power greater than the power of the curved surface or flat surface, and is not provided with a diffraction grating.

8 Claims, 9 Drawing Sheets

Related U.S. Application Data

(60) Provisional application No. 62/336,802, filed on May 16, 2016.

(51) Int. Cl.
*G02B 13/00* (2006.01)
*F21V 5/04* (2006.01)
*F21S 41/00* (2018.01)
*F21S 41/275* (2018.01)
*F21S 41/40* (2018.01)
*G02B 5/18* (2006.01)
*G02B 27/00* (2006.01)

(52) U.S. Cl.
CPC .............. *F21V 5/04* (2013.01); *G02B 5/1814* (2013.01); *G02B 13/00* (2013.01); *G02B 27/0037* (2013.01)

(58) Field of Classification Search
USPC ....... 362/538, 539, 520, 521, 311.02, 311.04
See application file for complete search history.

(56) References Cited

U.S. PATENT DOCUMENTS

| | | | |
|---|---|---|---|
| 8,696,180 B2* | 4/2014 | Ishida | F21S 41/321 |
| | | | 362/507 |
| 9,587,795 B2 | 3/2017 | Ohsawa et al. | |
| 10,174,900 B2* | 1/2019 | Schone | G02B 27/4272 |
| 2009/0257240 A1 | 10/2009 | Koike | |
| 2009/0310377 A1 | 12/2009 | Kanai | |
| 2014/0029287 A1 | 1/2014 | Knzai et al. | |
| 2016/0146417 A1* | 5/2016 | Ohsawa | F21S 41/143 |
| | | | 362/521 |

FOREIGN PATENT DOCUMENTS

| | | |
|---|---|---|
| JP | 2012252838 A | 12/2012 |
| JP | 2014-026741 A | 2/2014 |
| WO | 2009/028076 A1 | 3/2009 |
| WO | 2015040671 A1 | 3/2015 |

OTHER PUBLICATIONS

Dec. 20, 2019 Extended Search Report issued in European Patent Application No. 17799265.8.

* cited by examiner

PROJECTOR TYPE HEADLAMP

CROSS REFERENCE TO RELATED APPLICATION

This is a Continuation of International Patent Application No. PCT/JP2017/017848 filed May 11, 2017, which designates the U.S. and which claims priority from U.S. Provisional Patent Application No. 62/336,802, dated May 16, 2016. The contents of these applications are hereby incorporated by reference.

BACKGROUND

Technical Field

The present invention relates to a projector type headlamp.

Background Art

In a projector type headlamp, colors appear around the boundary between light and darkness on the periphery of a light distribution pattern due to chromatic aberrations of the projection lens unit of the projector type headlamp. The appearance of colors is troublesome. In order to reduce these colors that appear, the chromatic aberrations of the projection lens unit has to be compensated. Under the above-described situation, a diffraction grating provided on a surface of the projection lens unit has been proposed in order to reduce the chromatic aberrations of the projection lens unit (Patent document 1).

However, when a light distribution pattern of the low beam is formed by the projection lens unit provided with a diffraction grating on a surface thereof, rays of the 0-order light of the diffraction grating reach positions above the cut-off line of the light distribution pattern on a virtual screen, and luminous intensity at the positions might be so great that regulations might not be satisfied.

Conventionally a projector type headlamp that is configured so as to reduce colors that appear around the boundaries between light and darkness on the peripheries of the light distribution patterns without an increase in luminous intensity in an area above the cut-off line of the light distribution pattern of the low beam on a virtual screen has not been developed.

PRIOR ART DOCUMENT

Patent Document

Paten document 1: JP2014-26741A

Accordingly, there is a need for a projector type headlamp that is configured so as to reduce colors that appear around the boundaries between light and darkness on the peripheries of the light distribution patterns without an increase in luminous intensity in an area above the cut-off line of the light distribution pattern of the low beam on a virtual screen. The object of the present invention is to provide a projector type headlamp that is configured so as to reduce colors that appear around the boundaries between light and darkness on the peripheries of the light distribution patterns without an increase in luminous intensity in an area above the cut-off line of the light distribution pattern of the low beam on a virtual screen.

SUMMARY OF THE INVENTION

A projector type headlamp according to the present invention includes a projection lens unit located along an optical axis that extends in the longitudinal direction of a vehicle and a light source unit located in the rear of the back focal plane of the projection lens unit and is configured such that light distribution patterns of the high beam and of the low beam are formed by the single projection lens unit. The light source unit is configured to form an image of the light source on or in the vicinity of the back focal plane of the projection lens unit and to illuminate an area ahead through the projection lens unit for formation of the light distribution patterns with boundaries between light and darkness, a diffraction grating is provided on at least a part of a lens surface of the projection lens unit, the diffraction grating is designed so as to cancel chromatic aberrations caused by light from the light source unit illuminating an area ahead through the projection lens unit, and when the point of intersection between the optical axis and a plane perpendicular to the optical axis is defined as the origin point O, an x axis in the horizontal direction and a y axis in the vertical direction are defined in the plane, the maximum value of y coordinate on the lens surface is represented as R1, and a constant that is equal to or greater than 0 and smaller than 1 is represented as A, an area that satisfies y<A·R1 on the lens surface is formed by a continuous curved surface or a flat surface at least partially provided with the diffraction grating and an area that satisfies y≥A·R is formed by another curved surface that has a power greater than a power of the continuous curved surface or the flat surface and that is not provided with a diffraction grating.

In the projector type headlamp according to the present invention, when the maximum value of y coordinate on the lens surface is represented as R1, and a constant that is equal to or greater than 0 and smaller than 1 is represented as A, the area that satisfies y<A·R1 on the lens surface is formed by a continuous curved surface or a flat surface at least partially provided with the diffraction grating and the area that satisfies y≥A·R is formed by another curved surface that has a power greater than a power of the continuous curved surface or the flat surface and that is not provided with a diffraction grating. In the headlamp, light rays that reach an area in the vicinity of the cut-off line of the light distribution pattern of the low beam pass through the area that satisfies y≥A·R and that is not provided with a diffraction grating. Accordingly, the light lays that reach an area in the vicinity of the cut-offline of the light distribution pattern of the low beam are prevented from reaching an area above the cut-off line of the light distribution pattern as the zero-order light of a diffraction grating.

In a projector type headlamp according to the first embodiment of the present invention, In a projector type headlamp according to the first embodiment of the present invention, A<0.5 is satisfied.

If A≥0.5, the light rays of the zero-order light of the diffraction grating that are directed to an area in the vicinity of the cut-off line cannot be reduced to a sufficient extent.

In a projector type headlamp according to the second embodiment of the present invention, the projection lens unit is composed of two synthetic resin lenses located along the optical axis, and the diffraction grating is provided on at least a part of a lens surface on the opposite side from the light source unit of a light-source-side synthetic resin lens located closer to the light source unit of the two synthetic resin lenses.

In a projector type headlamp according to the third embodiment of the present invention, when the composite focal length of the two synthetic resin lenses is represented by EFL and a space between the two synthetic resin lenses is represented by T12, $$T12/EFL<0.1$$

is satisfied

In order to assemble the two lenses without a spacer, a wall extending perpendicularly to the lens edge of a lens has to be provided. When T12/EFL is equal to or greater than 0.1, the thickness of the wall extending perpendicularly to the lens edge becomes so great that the formability of the lens will deteriorate. Further, the distance between the front side of the lens unit and the light source becomes greater, and therefore the size of the headlamp unit becomes greater. Further, the distance between the surface on the light source side of the light-source-side lens and the light source becomes smaller, and therefore the lens will be more easily affected by heat.

In a projector type headlamp according to the fourth embodiment of the present invention, when the center thickness of the light-source-side lens is represented by T2, $$0.16 < T2/EFL$$

is satisfied.

When the above-described condition is satisfied, a sufficiently great value of the center thickness of the light-source-side lens provided with the diffraction grating, can be ensured, and therefore the eccentricity of wall thickness can be reduced to reduce difficulties in forming.

In a projector type headlamp according to the fifth embodiment of the present invention, the power of said another curved surface is substantially equivalent to the power of the continuous curved surface or the flat surface provided with the diffraction grating.

In the present embodiment, light rays that reach an area in the vicinity of the cut-off line of the light distribution pattern of the low beam travel along paths that are similar to the paths of the first-order light of the diffraction grating, and therefore the light rays are prevented from reaching an area above the cut-off line of the light distribution pattern. The phrase "the power of said another curved surface is substantially equivalent to the power of the continuous curved surface or the flat surface provided with the diffraction grating" means that the power of said continuous curved surface is 0.5 to 1.5 times and more preferably 0.8 to 1.2 times as great as the power of the continuous curved surface or the flat surface provided with the diffraction grating.

In a projector type headlamp according to the sixth embodiment of the present invention, said another curved surface is an aspheric surface.

In a projector type headlamp according to the seventh embodiment of the present invention, the light distribution patterns include a plurality of light distribution patterns arranged horizontally in a line or in a matrix.

In a projector type headlamp according to the eighth embodiment of the present invention, in the area that satisfies y<A·R1 on the surface on the opposite side from the light source unit of the light-source-side synthetic resin lens, the diffraction grating is provided in an outer annular area, and a diffraction grating is not provided inside the outer annular area.

According to the present embodiment, a diffraction grating is provided only in the area through which the light rays that reach an area around the upper periphery of the light distribution pattern and that might cause the problem of an appearance of colors. Consequently, the efficiency can be increased by reducing the loss due to diffraction, and stray lights can be reduced.

MODE FOR CARRYING OUT THE INVENTION

Figure 1:
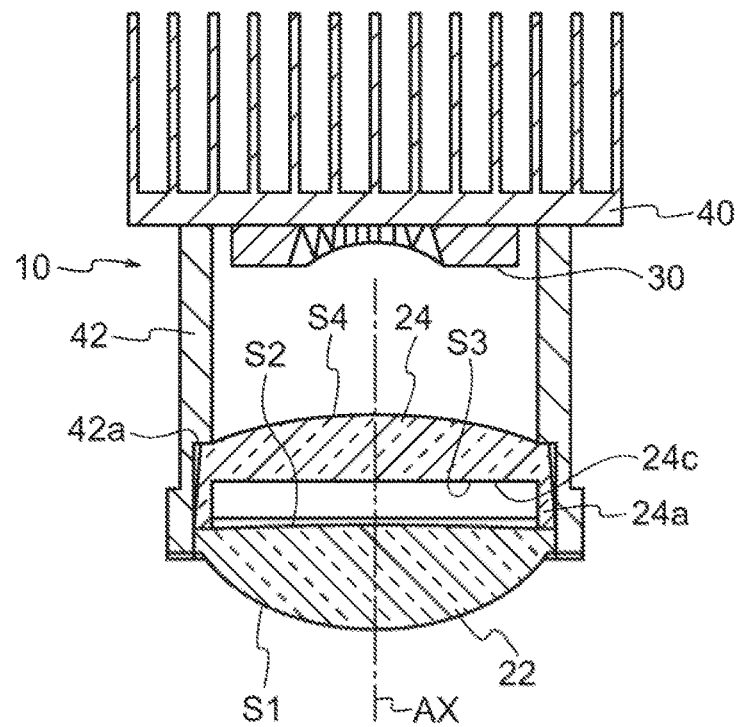
FIG. 1 shows a cross section of the lighting unit of a projector type according to an embodiment of the present invention.

FIG. 1 shows a cross section of a lighting unit 10 of a projector type headlamp according to an embodiment of the present invention. The lighting unit 10 includes a projection lens unit 20 located along an optical axis AX that extends in the longitudinal direction of a vehicle and a light source unit 30 located in the rear of the back focal plane of the projection lens unit 20. FIG. 1 shows a cross section containing the optical axis AX.

The projection lens unit 20 is composed of two synthetic resin lenses (plastic lenses), that is, a first synthetic resin lens 22 and a second synthetic resin lens 24 located along the optical axis AX with a certain space between them. The first synthetic resin lens 22 and the second synthetic resin lens 24 are held by a lens barrel 42 that is fixed to a supporting member 40 and located along the optical axis AX. Inside the front end (on the opposite side from the light source) of the lens barrel 42, a seat 42a that extends laterally on the inside wall is formed. The seat 42a is used to accommodate and hold the projection lens unit 20.

The projection lens unit 20 is inserted into the lens barrel 42 till the second synthetic resin lens 24 hits the seat 42a, and then the projection lens unit 20 is fixed to the lens barrel 42 by means known to the public such as screws, an adhesive or a snap-fit.

Figure 2:
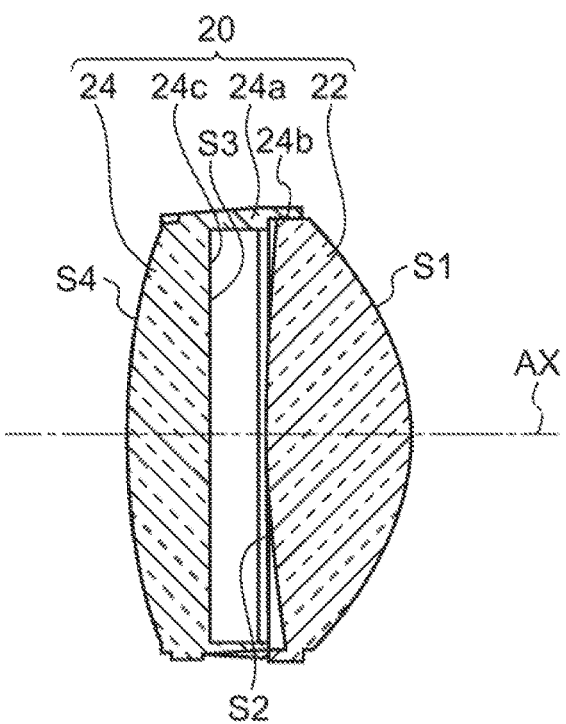
FIG. 2 shows a cross section containing the optical axis AX of the projection lens unit in the lighting unit.

FIG. 2 shows a cross section containing the optical axis AX of the projection lens unit 20 in the lighting unit 10. The surface on the opposite side from the light source of the first synthetic resin lens 22, the surface on the side of the light source of the first synthetic resin lens 22, the surface on the opposite side from the light source of the second synthetic resin lens 24 and the surface on the side of the light source of the second synthetic resin lens 24 are referred to as a lens surface S1, a lens surface S2, a lens surface S3 and a lens surface S4 respectively. The second synthetic resin lens 24 includes a barrel portion 24a that extends from the periphery thereof toward the first synthetic resin lens 22. Inside the front end (on the opposite side from the light source) of the barrel portion 24a, a seat 24b that extends laterally on the inside wall is formed. The seat 24b is used to accommodate and hold the first synthetic resin lens 22. The first synthetic resin lens 22 is inserted into the barrel portion 24a till the first synthetic resin lens 22 hits the seat 24b, and then the first synthetic resin lens 22 is fixed to the barrel portion 24a by means known to the public such as screws, an adhesive or a snap-fit.

The light source unit 30 is located on the surface on the side of the projection lens unit 20 of the supporting member 40 as shown in FIG. 1.

Figure 3:
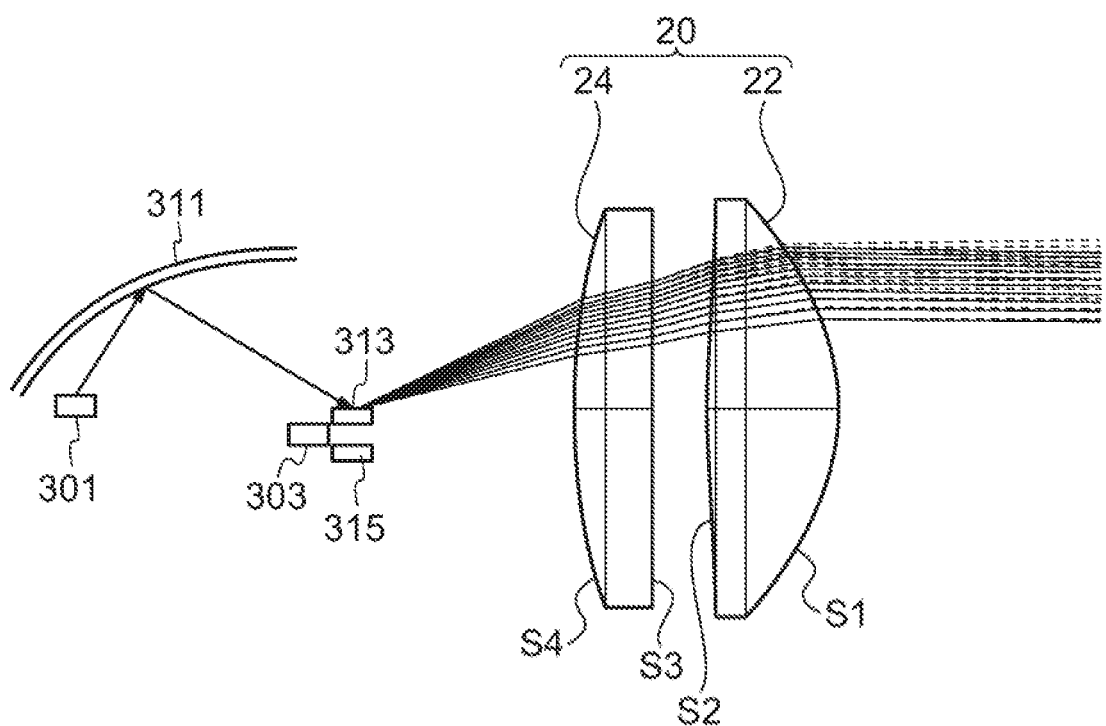
FIG. 3 illustrates the structure and the function of an example of the light source unit.

FIG. 3 illustrates the structure and the function of an example of the light source unit 30. The light source unit 30 includes a light source 301 for the low beam, a light source 303 for the high beam, a reflector 311, a low beam shade and high beam separator 313 and a high beam separator 315. The light source 301 for the low beam may include light emitting units such as LDs (laser diodes). The light source 303 for the high beam may include emitting units such as LEDs (light emitting diodes) or LDs (laser diodes) arranged in the direction perpendicular to the sheet of FIG. 3. A portion of light emitted by the light source 301 for the low beam and reflected by the reflector 311 is reflected by the low beam shade 313, and reaches the projection lens unit 20. Further, another portion of light emitted by the light source 301 for the low beam and reflected by the reflector 311 directly reaches the projection lens unit 20. Light emitted by the light source 303 for the high beam reaches the projection lens unit 20 through the high beam separator 313 and the high beam separator 315. The projection lens unit 20 projects an image of the light source formed on the back focal plane thereof by the light source unit 30 onto a vertical virtual screen placed ahead of the vehicle (for example, 25 meters ahead of the vehicle). Thus, the light distribution patterns described below are formed.

Figure 4:
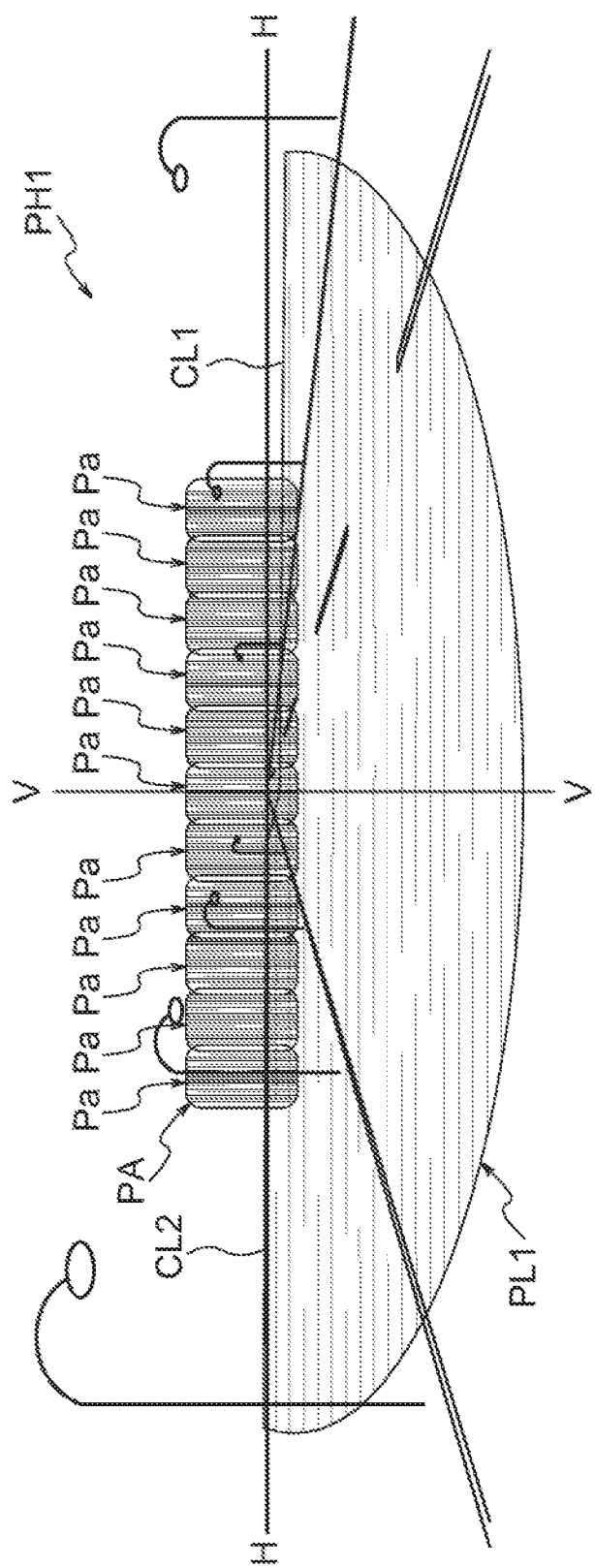
FIG. 4 shows a light distribution pattern PH1 formed on a virtual vertical screen to be placed 25 meters ahead of the vehicle by light of the lighting unit illuminating ahead when the light source unit described in JP2016-039154A is employed as the light source unit.

FIG. 4 shows a light distribution pattern PH1 formed on a virtual vertical screen to be placed 25 meters ahead of the vehicle by light of the lighting unit 10 illuminating ahead when the light source unit described in JP2016-039154A is employed as the light source unit 30.

The light distribution pattern PH1 is a synthetic light distribution pattern in which a light distribution pattern PL1 of the low beam and an additional light distribution pattern PA for the high beam are combined. The additional light distribution pattern PA is a synthetic light distribution pattern of plural light distribution patterns Pa formed by plural light emitting units.

The light distribution pattern PL1 of the low beam has horizontal cut-off lines CL1 and CL2 that are different in the level from each other. The cut-off line CL2 is formed below the line H-H that extends in the horizontal direction through the vanishing point HV.

Figure 5:
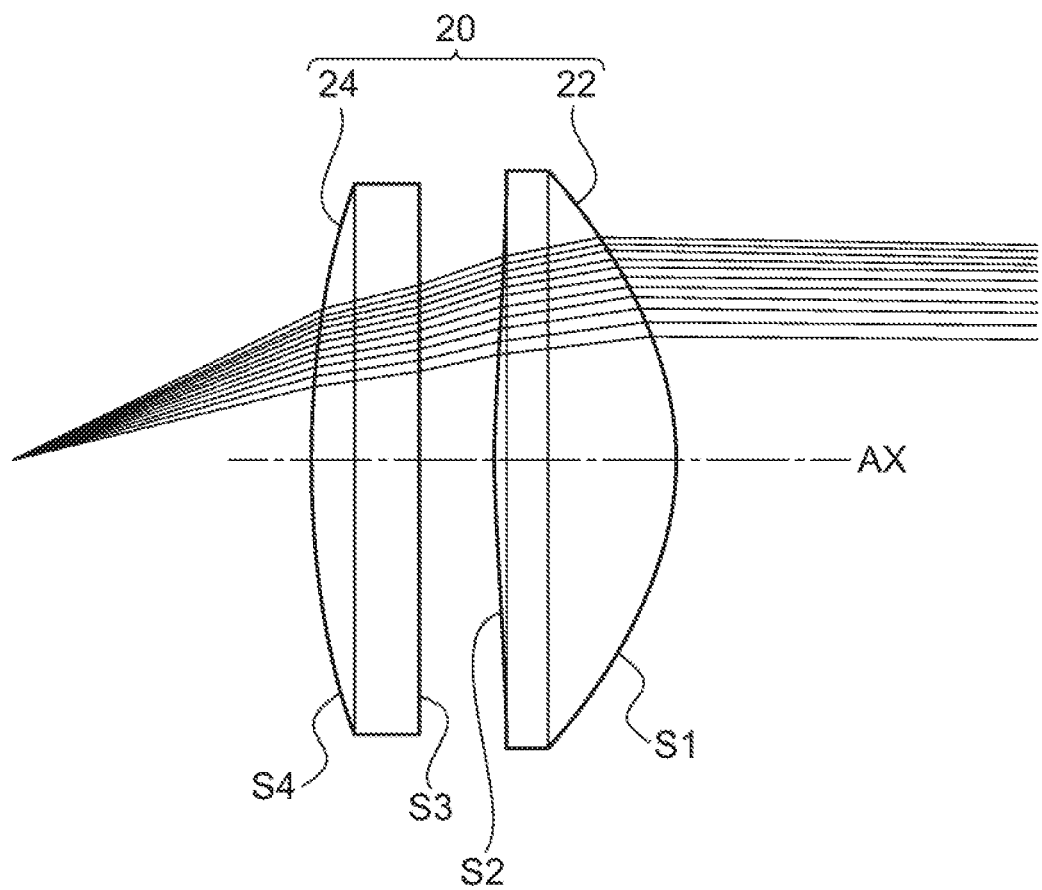
FIG. 5 shows paths of some of the light rays of the low beam that pass through the projection lens unit provided with a diffraction grating on a surface thereof.

FIG. 5 shows paths of some of the light rays of the low beam that pass through the projection lens unit provided with a diffraction grating on a surface thereof.

The power of the first synthetic resin lens 22 is greater than that of the second synthetic resin lens 24. The surface S1 on the opposite side from the light source of the first synthetic resin lens 22 is a curved surface that is convex toward the opposite side from the light source, and the surface S2 on the side of the light source of the first synthetic resin lens 22 is a curved surface that is convex toward the side of the light source. The surface S3 on the opposite side from the light source of the second synthetic resin lens 24 is a flat surface that is perpendicular to the optical axis, and the surface S4 on the side of the light source of the second synthetic resin lens 24 is a curved surface that is convex toward the side of the light source.

On the other hand, since refractive index of light varies depending on the wavelength of the light, colors appear around the boundary between light and darkness on the peripheries of the light distribution patterns due to chromatic aberrations of the projection lens unit 20 (the appearance of colors is also referred to as color breakup). In order to avoid the appearance of such colors, the chromatic aberrations of the projection lens unit 20 has to be compensated. Accordingly, a diffraction grating is provided on a surface of the projection lens unit 20 in order to compensate the chromatic aberrations of the projection lens unit 20. Since the refractive index of the material of the projection lens unit 20 decreases with wavelength, the power based on the refractive index of the material decreases with wavelength. On the other hand, the power based on diffraction is proportional to wavelength. Accordingly, the chromatic aberrations of the projection lens unit 20 can be compensated when a diffraction grating having a power that cancels the chromatic aberrations of the projection lens unit 20 is provided on a surface of the projection lens unit 20.

The diffraction grating is provided on the surface S3 on the opposite side from the light source of the second synthetic resin lens 24.

The reason why the diffraction grating is provided on the surface S3 on the opposite side from the light source of the second synthetic resin lens 24, the surface S3 being a flat surface that is perpendicular to the optical axis, is to reduce stray lights due to paths of light rays and machining of the mold. The detailed description is given in the paragraphs [0067] to [0074] of JP2014-026741A filed by the applicants of the present application. The surface S3 may be a curved surface with a relatively small curvature in place of a flat surface.

Figure 6:
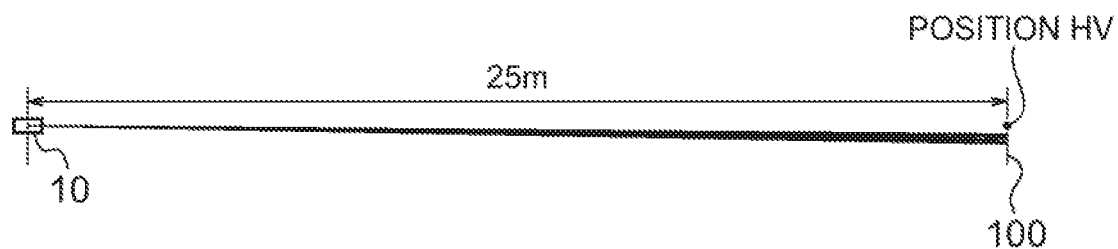
FIG. 6 shows paths of light rays of the low beam that illuminate an area around the upper periphery of the light distribution pattern of the low beam formed on the virtual screen by the lighting unit including the projection lens unit shown in FIG. 5.

FIG. 6 shows paths of light rays of the low beam that illuminate an area around the upper periphery of the light distribution pattern of the low beam formed on the virtual screen 100 by the lighting unit 10 including the projection lens unit shown in FIG. 5. The vertical screen is to be placed 25 meters ahead of the vehicle such that the vertical screen is perpendicular to the optical axis AX. The projection lens unit 20 is configured such that light rays of the low beam that illuminate the area around the upper periphery of the light distribution pattern of the low beam illuminate an area below the line H-H that extends in the horizontal direction through the vanishing point HV. In FIG. 6 and the succeeding drawings, "position HV" represents the position of the vanishing point HV. Light rays of the low beam in FIG. 5 and FIG. 6 are those of the first-order diffracted light of the diffraction grating. The optical system is designed based on the first-order diffracted light of the diffraction grating. For example, the optical system is designed such that the cut-off line CL2 is formed by the first-order diffracted light of the diffraction grating below the line H-H that extends in the horizontal direction through the vanishing point HV.

Figure 7:
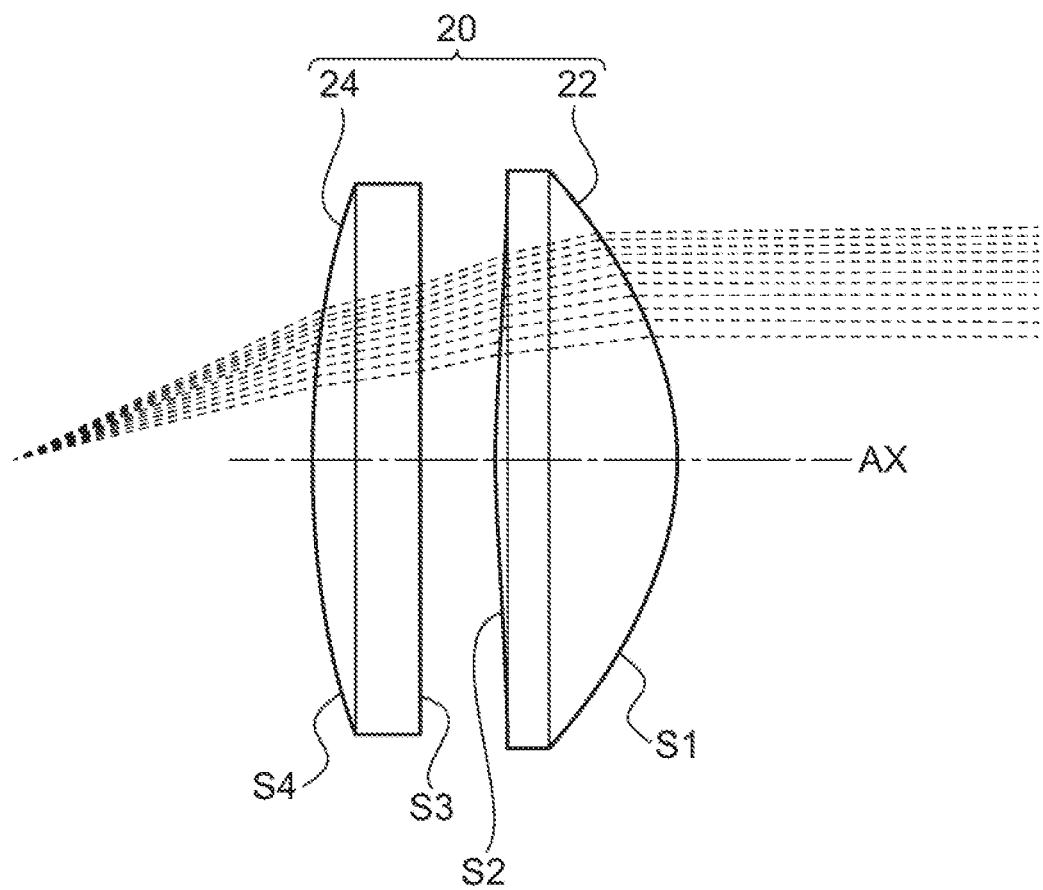
FIG. 7 shows paths of light rays of the zero-order diffracted light of the diffraction grating in the low beam that pass through the projection lens unit provided with the diffraction grating on a surface thereof.

FIG. 7 shows paths of light rays of the zero-order diffracted light of the diffraction grating in the low beam that pass through the projection lens unit provided with the diffraction grating on a surface thereof.

Figure 8:
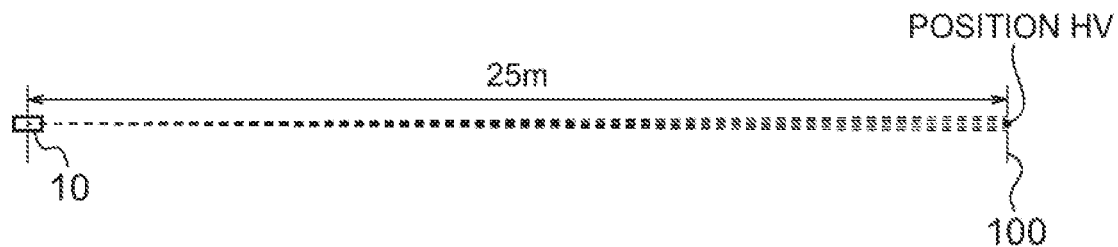
FIG. 8 shows paths of light rays of the zero-order diffracted light of the diffraction grating in the low beam that illuminate an area around the upper periphery of the light distribution pattern of the low beam formed on the virtual screen by the lighting unit including the projection lens unit shown in FIG. 7.

FIG. 8 shows paths of light rays of the zero-order diffracted light of the diffraction grating in the low beam that illuminate an area around the upper periphery of the light distribution pattern of the low beam formed on the virtual screen 100 by the lighting unit 10 including the projection lens unit shown in FIG. 7. The zero-order diffracted light of the diffraction grating travels in straight lines without being diffracted by the diffraction grating. Accordingly, the paths of light rays of the zero-order diffracted light of the diffraction grating in the low beam are placed above those of light rays of the first-order diffracted light of the diffraction grating, and therefore some of light rays of the zero-order diffracted light of the diffraction grating illuminate an area above the line H-H that extends in the horizontal direction through the vanishing point HV on the virtual screen 100. As a consequence, luminous intensity in an area in the vicinity of the cut-off line CL2 and above the line H-H that extends in the horizontal direction through the vanishing point HV increases and there arises a possibility that luminous intensity at a point there does not satisfy the regulations.

Figure 9:
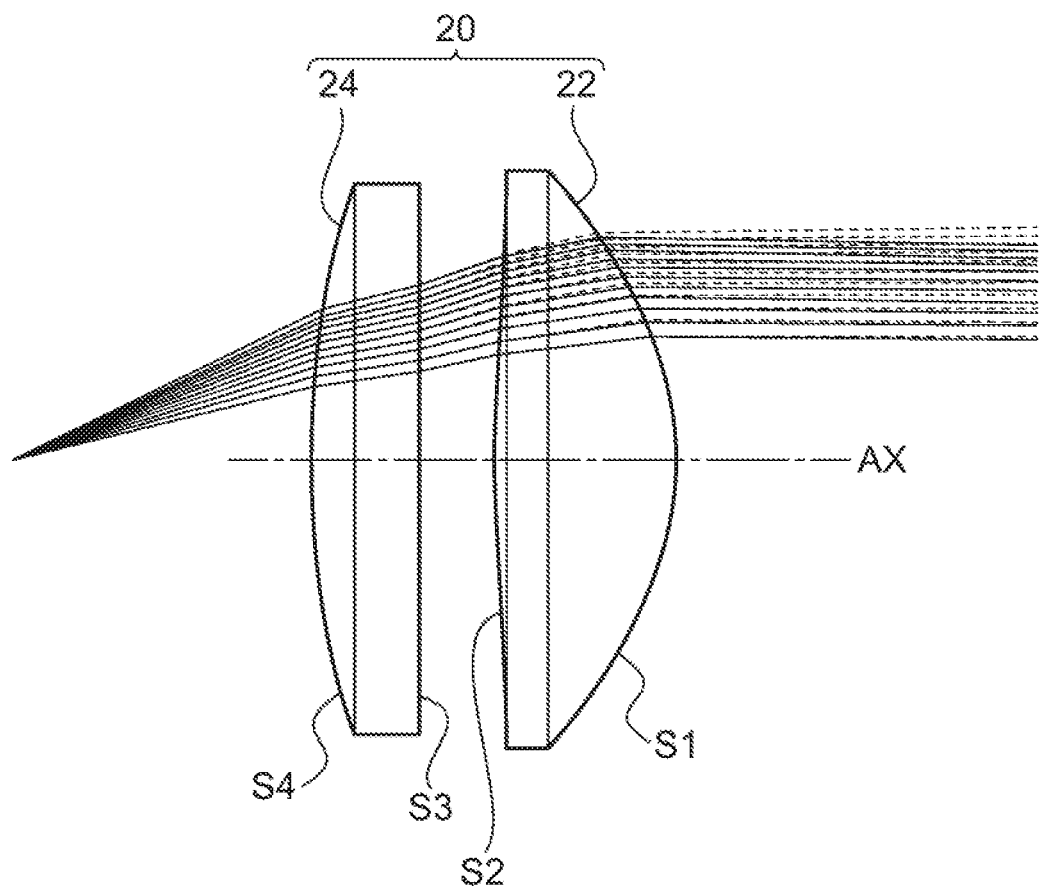
FIG. 9 shows paths of light rays of the zero-order diffracted light and the first-order diffracted light of the diffraction grating in the low beam that pass through the projection lens unit provided with the diffraction grating on a surface thereof.

FIG. 9 shows paths of light rays of the zero-order diffracted light and the first-order diffracted light of the diffraction grating in the low beam that pass through the projection lens unit provided with the diffraction grating on a surface thereof. In FIG. 9, the light rays of the first-order diffracted light are represented by solid lines, and the light rays of the zero-order diffracted light are represented by broken lines. The paths of the light rays in FIG. 9 are a combination of the paths of the light rays of FIG. 5 and the paths of the light rays of FIG. 7.

Figure 10:
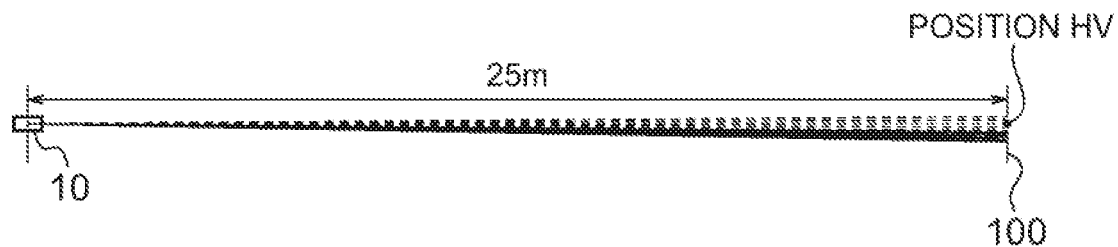
FIG. 10 shows paths of light rays of the first-order diffracted light and the zero-order diffracted light of the diffraction grating in the low beam that illuminate an area around the upper periphery of the light distribution pattern of the low beam formed on the virtual screen by the lighting unit including the projection lens unit shown in FIG. 9.

FIG. 10 shows paths of light rays of the first-order diffracted light and the zero-order diffracted light of the diffraction grating in the low beam that illuminate an area around the upper periphery of the light distribution pattern of the low beam formed on the virtual screen 100 by the lighting unit 10 including the projection lens unit shown in FIG. 9. In FIG. 10, the light rays of the first-order diffracted light are represented by solid lines, and the light rays of the zero-order diffracted light are represented by broken lines. The paths of the light rays in FIG. 10 are a combination of the paths of the light rays in FIG. 6 and the paths of the light rays of FIG. 8.

Thus, an area above the line H-H that extends in the horizontal direction through the vanishing point HV on the virtual screen 100 is illuminated by the zero-order diffracted light of the diffraction grating in the low beam that illuminate an area around the upper periphery of the light distribution pattern of the low beam. Accordingly, luminous intensity of the area above the line H-H that extends in the horizontal direction through the vanishing point HV increases and there arises a possibility that luminous intensity at a point there does not satisfy the regulations.

Figure 11:
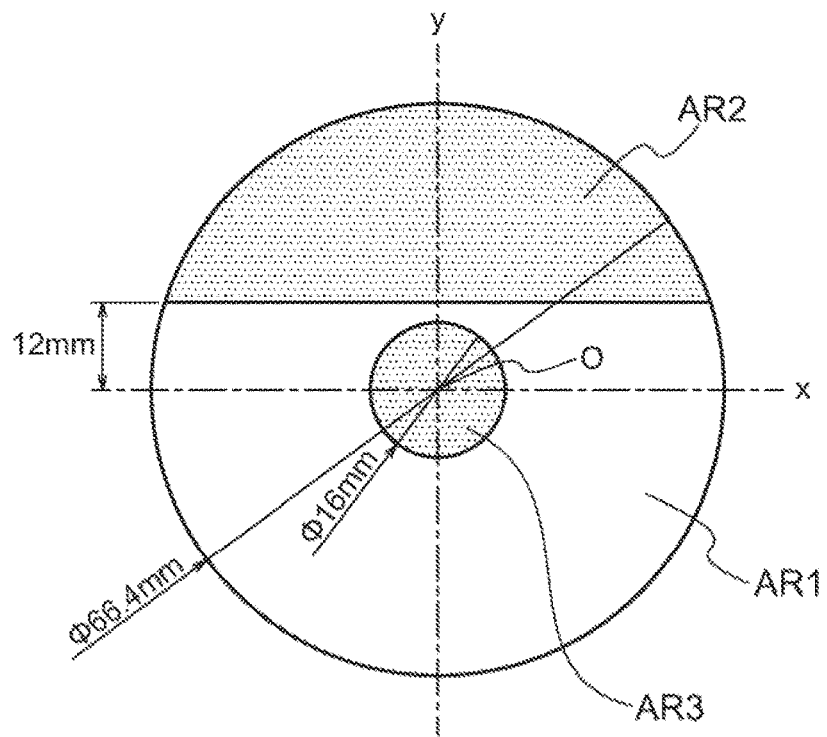
FIG. 11 shows a plan view of the surface S3 on the opposite side from the light source of the second synthetic resin lens in an example of the present invention.

FIG. 11 shows a plan view of the surface S3 on the opposite side from the light source of the second synthetic resin lens 24 of an example of the present invention. The surface S3 includes an area AR1, an area AR2 and an area AR3. The point of intersection between the optical axis AX and a plane perpendicular to the optical axis AX is defined as the origin point O, and an x axis in the horizontal direction and a y axis in the vertical direction are defined in the plane. The maximum value of y coordinate on the surface S3 is represented as R1, and a constant that is equal to or greater than 0 and smaller than 1 is represented as A In this example, R1=33.2 mm, and A=12/33.2=0.361. In FIG. 11, the origin point O agrees with the center of the circle that forms the periphery of the surface S3, and R1 represents the radius of the circle that forms the periphery of the surface S3. The area AR2 is that where y≥A·R1 is satisfied. The area AR3 is that where r≤8 mm is satisfied where r represents distance from the origin point. The area AR1 is the other area. The area AR1 is provided with a diffraction grating.

The area AR2 is not provided with a diffraction grating and is formed by a curved surface having a power that is substantially equivalent to that of the diffraction grating. The power that is substantially equivalent to that of the diffraction grating means a power that is 0.5 to 1.5 times and more preferably 0.8 to 1.2 times as great as that of the diffraction grating. Light rays that reach an area around the upper periphery of the light distribution pattern and might cause the problem of an appearance of colors, pass through the area AR2. If the area AR2 is provided with a diffraction grating like the area AR1, an area above the line H-H that extends in the horizontal direction through the vanishing point HV is illuminated by some of the light rays of the zero-order light of the diffraction grating as shown in FIG. 8. Accordingly, by replacing the diffraction grating with a curved surface having a power that is substantially equivalent to that of the diffraction grating, some of the light rays of the zero-order light of the diffraction grating are prevented from illuminating the area above the line H-H that extends in the horizontal direction through the vanishing point HV, for example.

The area AR3 is not provided with a diffraction grating. The reason why the area AR3 is not provided with a diffraction grating is that light rays that reach an area around the upper periphery of the light distribution pattern and might cause the problem of an appearance of colors do not pass through the area, and therefore a diffraction grating is not required in order to compensate the chromatic aberrations. The area AR3 may be formed by a curved surface having a power that is substantially equivalent to that of the diffraction grating. Alternatively, the area AR3 may be a flat surface provided with a diffraction grating like the area AR1.

Figure 12:
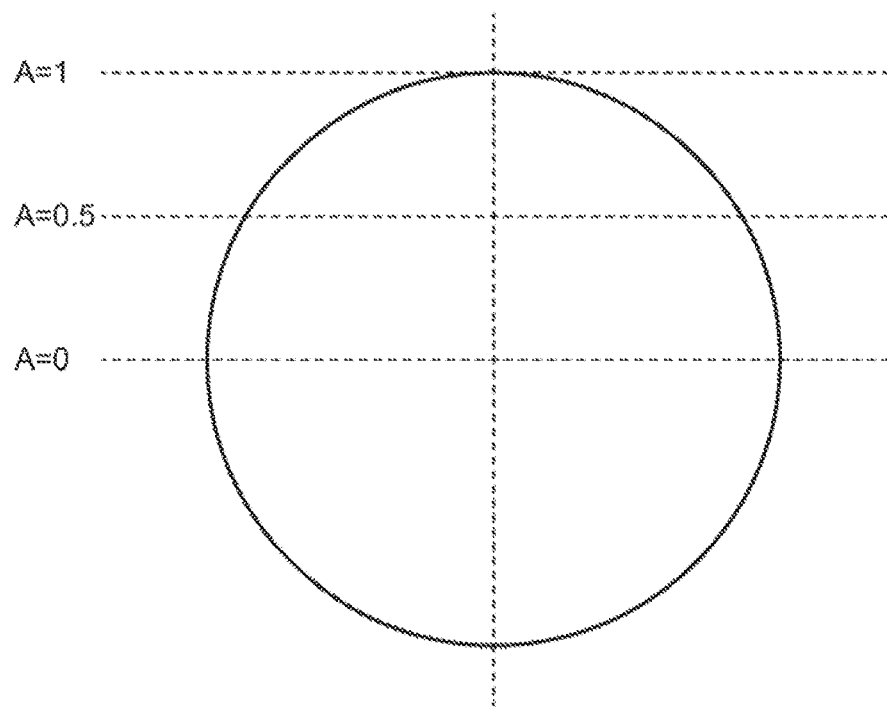
FIG. 12 is a drawing for illustrating the parameter A.

FIG. 12 is a drawing for illustrating the parameter A If A≥0.5, the light rays of the zero-order light of the diffraction grating that illuminate an area above the line H-H that extends in the horizontal direction through the vanishing point HV cannot be reduced to a sufficient extent, for example.

Figure 13:
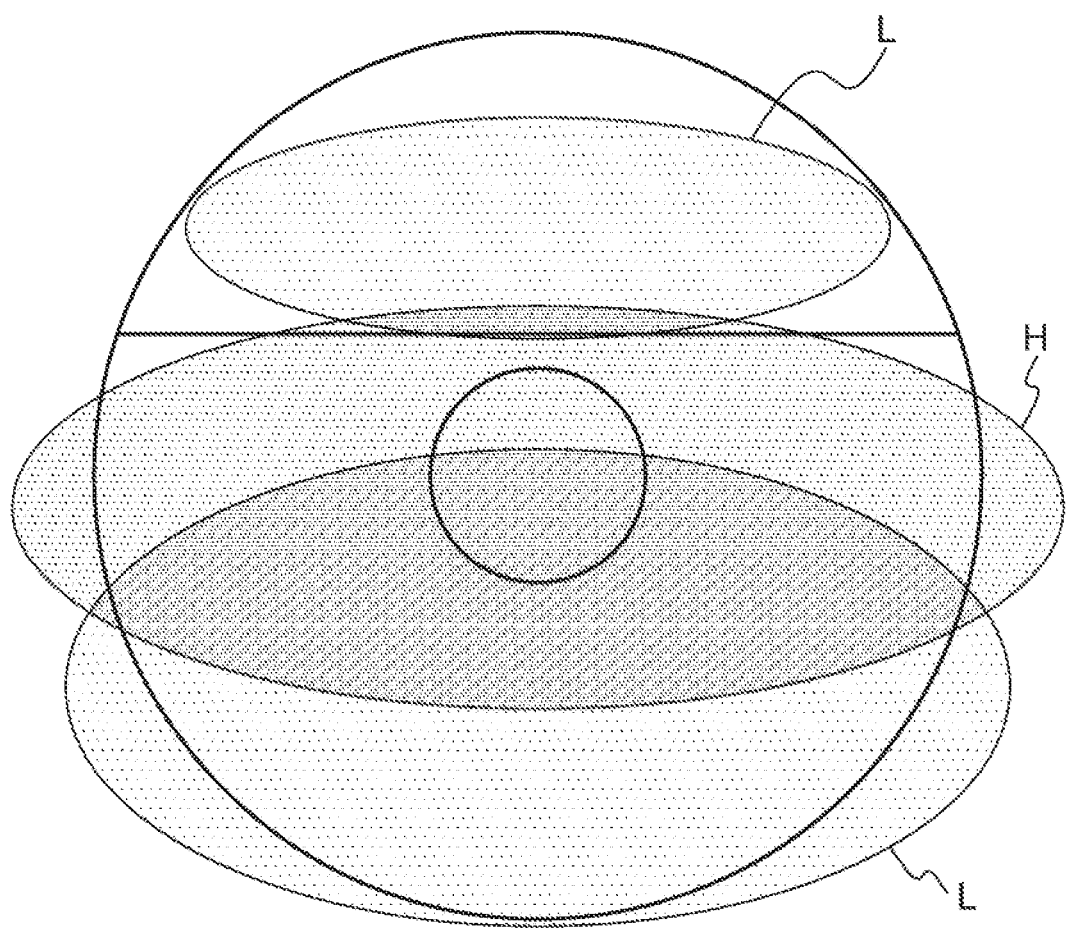
FIG. 13 shows an area H through which light rays that form the light distribution pattern of the high beam pass and areas L through which light rays that form the light distribution pattern of the low beam pass on the surface S3, by way of example.

FIG. 13 shows an area H through which light rays that form the light distribution pattern of the high beam pass and areas L through which light rays that form the light distribution pattern of the low beam pass on the surface S3, by way of example. Most of the light rays that form the light distribution pattern of the high beam can be made to pass through the area A1 provided with the diffraction grating by appropriately determining A such as A≥0.3, for example, and therefore an appearance of colors on the periphery of respective light distribution patterns can be avoided.

The area that is not provided with a diffraction grating and is formed by a curved surface having a power that is substantially equivalent to that of the diffraction grating may occupy 80% or more of the area that satisfies y≥A·R1. "Areas occupying 80% or more of the area that satisfies y≥A·R1" includes an area besides the area through which light rays do not pass in the area that satisfies y≥A·R1, areas in the area that satisfies y≥A·R1 that are shaped such that the boundary with the area AR1 provided with the diffraction grating extends along the upper periphery of the area H in FIG. 13 through which light rays that form the light distribution patterns for the high beam pass or along the lower periphery of the upper one of the areas L in FIG. 13 through which light rays that form the light distribution pattern of the low beam pass or the like.

Table 1 shows the values of focal length of the lenses of the present example. The unit of length is millimeter. "Entire" indicates the composite focal length. The material of the first synthetic resin lens 22 and the second synthetic resin lens 24 is polymethyl methacrylate (PMMA).

TABLE 1

| Lens 22 | Lens 24 | Entire (EFL) |
|---|---|---|
| 64 | 464 | 58 |

Table 2 shows the optical layout of the lenses. The unit of length is millimeter.

TABLE 2

| Center thickness of lens 22 | Space between lenses (T12) | Center thickness of lens 24 |
|---|---|---|
| 20 | 3 | 10 |

The equations for defining an aspheric surface forming each surface of the lenses are given below.

$$h = \sqrt{x^2 + y^2}$$

$$c = \frac{1}{R}$$

$$Z = \frac{ch^2}{1 + \sqrt{1 - (1+k)c^2 h^2}} + \sum_{i=1}^{m} A_i h^i$$

h represents distance from the optical axis AX, that is the central axis of the lenses, c represents curvature, R represents radius of curvature, k represents the conic constant, $A_i$ represent a constant, and m represents an integer. Further, z represents distance from the vertex of the aspheric surface, that is, the point of intersection between the optical axis and the aspheric surface. When a value of c is positive, the aspheric surface is convex to the opposite side from the light source.

Table 3 shows constants and coefficients of the above-described equations for each surface of the lenses. The unit of radius of curvature is millimeter. A positive value of radius of curvature indicates that the surface is convex to the opposite side from the light source, and a negative value of radius of curvature indicates that the surface is convex to the side of the light source.

TABLE 3

| | S1 | S2 | S3 | S4 |
|---|---|---|---|---|
| Type of surface | Aspheric | Aspheric | Flat | Aspheric |
| Radius of curvature R | 36.00423 | −204.2774 | infinity | −227.9623 |
| Conic constant k | −1.2564 | −100 | 0 | 48.54149 |
| $4^{th}$ order term $A_4$ | 3.085E−06 | 1.300E−06 | — | — |
| $6^{th}$ order term $A_6$ | −4.835E−09 | — | — | — |
| $8^{th}$ order term $A_8$ | 5.704E−12 | — | — | — |
| $10^{th}$ order term $A_{10}$ | −2.407E−15 | — | — | — |

Table 4 shows values of other parameters. T12 represents the space between the lenses, EFL represents the composite focal length, and T2 represents the central thickness of the second synthetic resin lens 24.

TABLE 4

| | A1 | T12/EFL | T2/EFL |
|---|---|---|---|
| Example | 0.361 | 0.05 | 0.17 |

T12/EFL should preferably be smaller than 0.1. In order to assemble the two lenses without a spacer, a wall extending perpendicularly to the lens edge of a lens has to be provided. When T12/EFL is equal to or greater than 0.1, the thickness of the wall extending perpendicularly to the lens edge becomes so great that the formability of the lens will deteriorate. Further, the distance between the front side of the lens unit and the light source becomes greater, and therefore the size of the headlamp unit becomes greater. Further, the distance between the surface on the light source side of the light-source-side lens and the light source becomes smaller, and therefore the lens will be more easily affected by heat.

T2/EFL should preferably be greater than 0.16. By making T2/EFL greater than 0.16, a sufficiently great value of the center thickness of the light-source-side lens 24 provided with the diffraction grating can be ensured, and therefore the eccentricity of wall thickness (the ratio of the greatest wall thickness to the smallest wall thickness) can be reduced to reduce difficulties in forming.

The equation for defining an optical path difference function of the diffraction grating formed on the area AR1 is given below.

$$\varphi = C2 \times h^2 + C4 \times h^4 + C6 \times h^6 + C8 \times h^8 + C10 \times h^{10}$$

C2 to C10 represent constants, and h represents distance from the optical axis AX, that is, the central axis of the lenses.

$$h = \sqrt{x^2 + y^2}$$

The unit of length is millimeter.

Table 5 shows constants of the equation for defining an optical path difference function of the diffraction grating.

TABLE 5

| Wavelength used for design | 540 nm |
|---|---|
| $2^{nd}$ order term (C2) | 0 |
| $4^{th}$ order term (C4) | −1.20E−06 |
| $6^{th}$ order term (C6) | 6.00E−10 |

The equations for defining the aspheric surface formed in the areas AR2 and AR3 and having a power that is substantially equivalent to that of the diffraction grating are given below.

$$h = \sqrt{x^2 + y^2}$$

$$c = \frac{1}{R}$$

$$Z = \frac{ch^2}{1 + \sqrt{1-(1+k)c^2h^2}} + \sum_{i=1}^{m} A_i h^i$$

h represents distance from the optical axis AX, that is the central axis of the lenses, c represents curvature, R represents radius of curvature, k represents the conic constant, Ai represents a constant, and m represents an integer. Further, z represents distance from the vertex of the aspheric surface, that is, the point of intersection between the optical axis and the aspheric surface. When a value of c is positive, the aspheric surface is convex to the opposite side from the light source.

Table 6 shows constants of the above-described equations for defining the aspheric surface.

TABLE 6

| | |
|---|---|
| R | Infinity (c = 0) |
| k | 0 |
| $4^{th}$ order term (A4) | 2.42E−06 |
| $6^{th}$ order term (A6) | −1.16E−09 |

Figure 14:
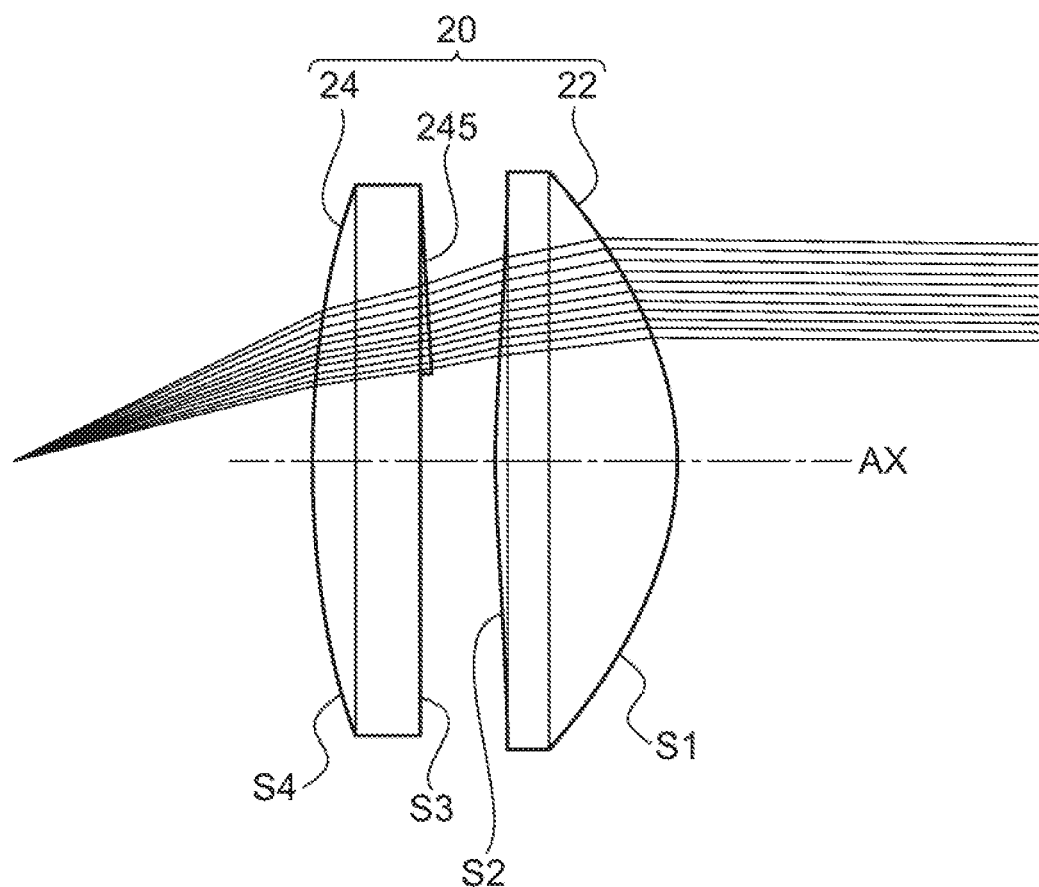
FIG. 14 shows paths of light rays of the low beam that pass through the projection lens unit of the example provided with the diffraction grating on a surface thereof and FIG. 15 shows paths of light rays of the low beam generated by the lighting unit including the projection lens unit shown in FIG. 14 to illuminate the virtual screen.

FIG. 14 shows paths of the light rays of the low beam that pass through the projection lens unit of the example provided with the diffraction grating on a surface thereof. In FIG. 14, the portion with an aspheric surface, which corresponds to the area AR2 in FIG. 11 is marked with reference numeral 245. The drawing is drawn such that the curvature of the portion with the aspheric surface is made greater than the actual one for easier understanding. In FIG. 14, the portion with an aspheric surface, which corresponds to the area AR3 in FIG. 11 is not shown.

Figure 15:
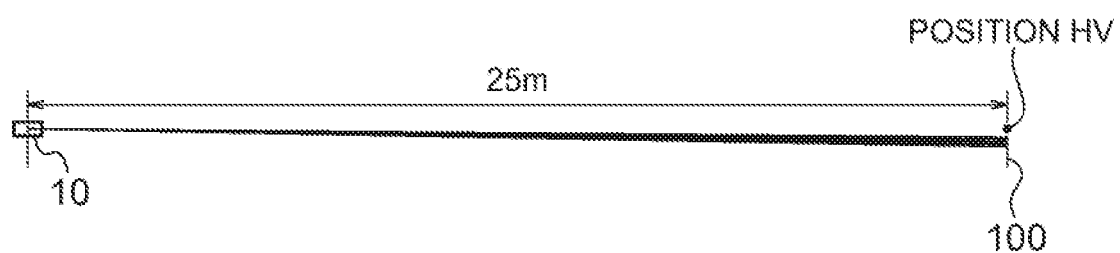

FIG. 15 shows paths of light rays of the low beam generated by the lighting unit 10 including the projection lens unit shown in FIG. 14 to illuminate the virtual screen 100.

In the present example, the diffraction grating in the area AR2 through which light rays of the low beam that illuminate an area around the upper periphery of the light distribution pattern of the low beam formed on the virtual screen 100 pass has been replaced with an aspheric surface having a power that is substantially equivalent to that of the diffraction grating. Accordingly, an area above the line H-H that extends in the horizontal direction through the vanishing point HV will not be illuminated by the zero-order light of the diffraction grating. As a consequence, an event in which luminous intensity in an area above the line H-H increases, and luminous intensity at a point there does not satisfy the regulations will be avoided.

Further, most of the light rays that form the light distribution patterns for the high beam can be made to pass through the area AR1 provided with the diffraction grating, and therefore an appearance of colors on the peripheries of respective light distribution patterns can be avoided.

Accordingly, according to the present invention, a projector type headlamp with which an event in which luminous intensity at a point does not satisfy the regulations can be avoided while colors that appear around the periphery of respective light distribution patterns can be reduced can be obtained.

EXPLANATIONS OF LETTERS OR NUMERALS

10 . . . a lighting unit, 20 . . . a projection lens unit, 22 . . . a first synthetic resin lens, 24 . . . a second synthetic resin lens, 245 . . . a curved surface having a power that is substantially equivalent to that of the diffraction grating

What is claimed is:

1. A projector type headlamp comprising a projection lens unit located along an optical axis that extends in the longitudinal direction of a vehicle and a light source unit located in the rear of the back focal plane of the projection lens unit, the projector type headlamp being configured such that light distribution patterns of the high beam and low beam are formed by the single projection lens unit,
   wherein the projection lens unit is composed of two synthetic resin lenses located along the optical axis,
   the light source unit is configured to form an image of the light source on or in the vicinity of the back focal plane of the projection lens unit and to illuminate an area ahead through the two synthetic resin lenses for formation of the light distribution patterns with boundaries between light and darkness,
   a diffraction grating is provided on at least a part of a lens surface on the opposite side from the light source unit of the light-source-side synthetic resin lens located closer to the light source unit of the two synthetic resin lenses,
   a lens surface on the side of the light source unit of the light-source-side synthetic resin has a positive power,
   the diffraction grating is designed so as to cancel chromatic aberrations caused by light from the light source unit illuminating an area ahead through the two synthetic resin lenses, and
   when the point of intersection between the optical axis and a plane perpendicular to the optical axis is defined as the origin point O, an x axis in the horizontal direction and a y axis in the vertical direction are defined in the plane, the maximum value of y coordinate on the lens surface on the opposite side from the light source unit of the light-source-side synthetic resin lens is represented as R1, and a constant that is equal to or greater than 0 and smaller than 1 is represented as A, an area that satisfies y<A·R1 on the lens surface on the opposite side from the light source unit of the light-source-side synthetic resin lens is formed by a continuous curved surface or a flat surface at least partially provided with the diffraction grating and an area that satisfies y≥A R1 is formed by another curved surface that has a power greater than a power of the continuous curved surface or the flat surface and that is not provided with a diffraction grating.

2. A projector type headlamp according to claim 1, wherein A<0.5 is satisfied.

3. A projector type headlamp according to claim 1, wherein when the composite focal length of the two synthetic resin lenses is represented by EFL and a space between the two synthetic resin lenses is represented by T12, $T12/EFL<0.1$ is satisfied.

4. A projector type headlamp according to claim 1, wherein when the center thickness of the light-source-side lens is represented by T2, $0.16<T2/EFL$ is satisfied.

5. A projector type headlamp according to claim 1, wherein the power of said another curved surface is substantially equivalent to the power of the continuous curved surface or the flat surface provided with the diffraction grating.

6. A projector type headlamp according to claim 1, wherein said another curved surface is an aspheric surface.

7. A projector type headlamp according to claim 1, wherein the light distribution patterns include a plurality of light distribution patterns arranged horizontally in a line or in a matrix.

8. A projector type headlamp according to claim 1, wherein in the area that satisfies y<A·R1 on the surface on the opposite side from the light source unit of the light-source-side synthetic resin lens, the diffraction grating is provided in an outer annular area, and a diffraction grating is not provided inside the outer annular area.

* * * * *